6747X
W. P. SAMPLE.
Harrow.
No Printed Specification Available
Patented Sept. 3, 1831.
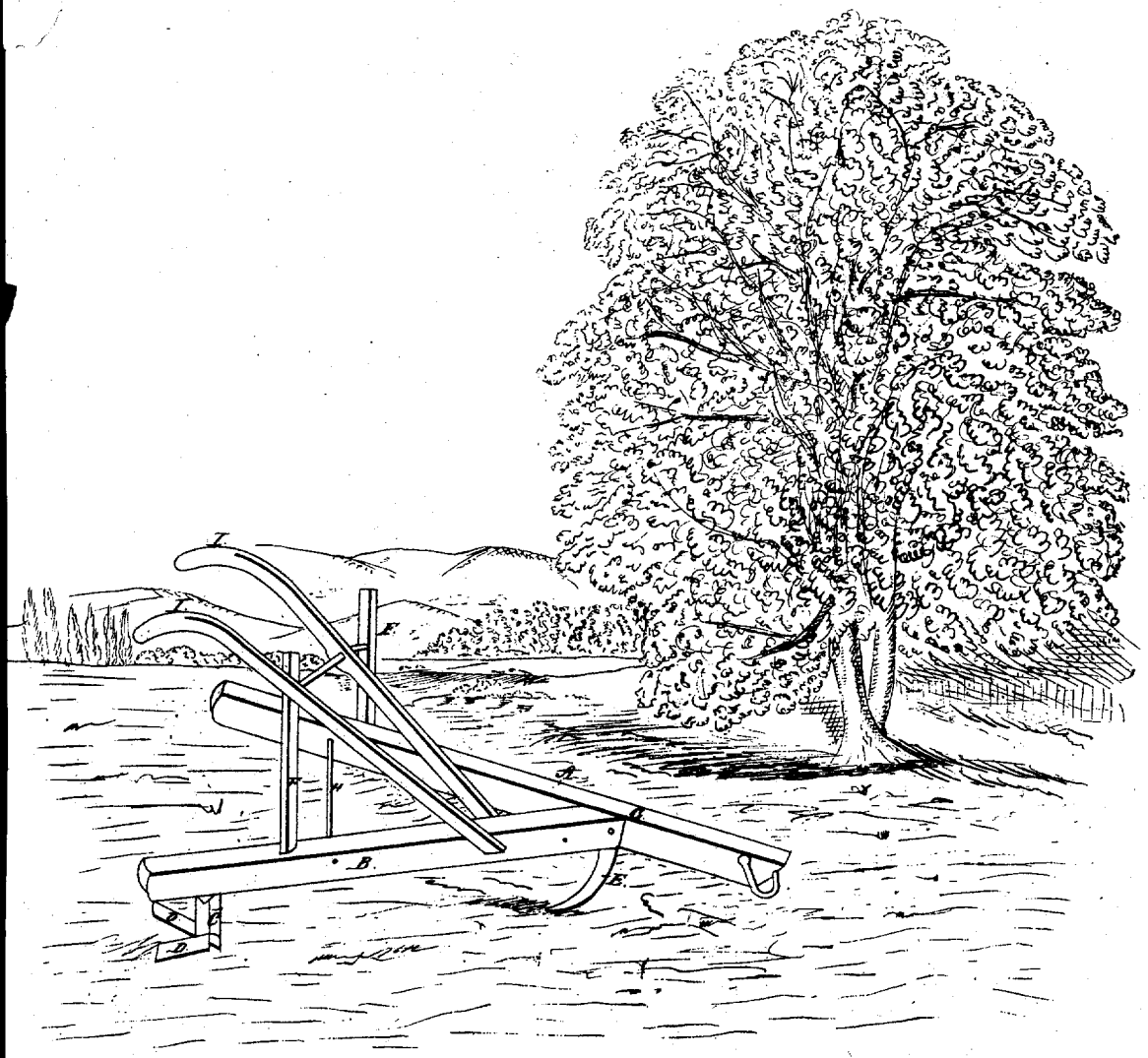
AM. PHOTO-LITHO. CO. N.Y. (OSBORNE'S PROCESS.)

Sept 3, 1831

6747X William P. Sample
Letters Patent

The Schedule referred to in these Letters Patent and making part of the same con-
taining a description in the words of the said William P. Sample himself of his
Improvement in the machine for cultivating cotton called Sample's improved
Cotton scraper and Harrow

---

To all to whom these presents shall come. Be it known that I William P.
Sample of the County of Bedford and State of Tennessee have invented a
new and useful improvement in the cultivation of cotton which I call Samp-
les improved cotton scraper & Harrow and that the following is a full
& exact description of the construction & operation of said machine as invented
or improved by me. A. represents the longest wooden beam about five feet long
and from 2½ to 3½ inches square. B. represents the short wooden beam about
four feet long and of the same size as A. These beams may be longer or short-
er larger or smaller according to the fancy of the builder & the kind of soil
in which they are to be used. C. the wooden helve about 8 inches long of
a triangular form which is let into the hind end of the short beam with
an oblique tenon in order that the scrapers or harrow attached to this helve
may run nearly (but not quite) on a right line with the beam. A. D.
represents the iron plates or scrapers from twelve to twenty inches long as
the soil may [illegible] & from five to eight inches wide. These are screwed
or otherwise fastened on each side of the helve C. leaving a space in front
of about four inches widening behind according to the soil the fancy
of the cultivator & length of the scrapers from fifteen to twenty five or
thirty inches, a dry sandy soil admitting the use of long scrapers & a
close grassy soil the short kind. These scrapers pass on each side of the
cotton & therefore clean an entire row at once. A hollow being left in
the lower end of helve C. of four inches in front, five or six inches in the
back part & four or five inches deep will permit the machine to run
immediately on the cotton without injury & scrape or harrow on both
sides at the same time. To make the scrapers cut & shave the earth & grass
nicely nicely the lower part must be sharp & from one to two inches of it bent forward. likewise about one & half inch of the front part must be bent so as
to run on a straight line with the cotton to prevent clods & other trash
from injuring it. E represents the foot on which the long beam rests &
may be about 12 or 14 inches long). F. represents the upright on which
the handles are fastened by a pin passing through the uprights & handles
by which the machine is governed. G. represents the point where the two
beams are mortised or pinned together. H. represents the brace or pin let
into the beams A & B. near the hind end in order to keep them steady
& firm & about 18 inches apart. I represents the handles. To convert
the same frame or machine into a cotton harrow take off the scrapers
& insert into the foot of the same helve two bent iron teeth or small coul-
ters about six inches apart these teeth or coulters are likewise to run on
each side of the cotton & are designed to break up the ground & sift in
among the cotton a sufficient quantity of mould to cover young grass &c.
And if it should be desired to use a complete harrow with two three
or more teeth on each side take off the helve & attach this harrow in
place of the helve & it will work on the same principle. I am aware
that many cotton scrapers & harrows are in use & some of them so far as
a single scraper is like a double scraper resemble mine, (that is the
iron or steel plate separated from the machine) likewise I have seen
harrows to act on both sides of the cotton at the same time, but in every
such case the horse or mule was compelled to walk immediately on the
cotton. Therefore the claim I make for a patent on my invention
does not rest on the form of the plates of the scraper nor on the form of the
iron teeth of the harrow separated from the machine, but mainly
upon the wooden part: for by the mechanism & frame of the wooden part
of my machine the horse or mule walks one foot from the cotton, when
at the same time the instrument is directly on it. Two scrapers being
fixed on the same helve double work is done & the machine runs more
steady. And in harrowing the same effect is produced on the same
principle. Note. Although the mechanism of the wooden part is the
main improvement yet the application of scrapers & harrows [illegible]
to 6747x Sept 3, 1831 to such a machine being a new principle. at least so far as to do double work, I presume that the whole ought to be embraced in the patent Witnesses James L. Armstrong Darling D. Arnold W. P. Sample Ex.

AJW